May 1, 1962

B. P. BAKER ETAL 3,032,689

CIRCUIT INTERRUPTER ASSEMBLY

Filed March 31, 1958

May 1, 1962   B. P. BAKER ETAL   3,032,689
CIRCUIT INTERRUPTER ASSEMBLY
Filed March 31, 1958   5 Sheets-Sheet 2

May 1, 1962 B. P. BAKER ETAL 3,032,689
CIRCUIT INTERRUPTER ASSEMBLY
Filed March 31, 1958 5 Sheets-Sheet 4

Fig. 2C.

May 1, 1962 B. P. BAKER ETAL 3,032,689
CIRCUIT INTERRUPTER ASSEMBLY
Filed March 31, 1958 5 Sheets-Sheet 5

United States Patent Office 3,032,689
Patented May 1, 1962

3,032,689
CIRCUIT INTERRUPTER ASSEMBLY
Benjamin P. Baker, Monroeville, Pa., and Robert F. Karlicek, Lombard, Ill., assignors to Westinghouse Electric Corporation, East Pittsburgh, Pa., a corporation of Pennsylvania
Filed Mar. 31, 1958, Ser. No. 725,286
12 Claims. (Cl. 317—15)

This invention relates to circuit interrupter assemblies in general, and, more particularly, to circuit interrupter equipment including a circuit interrupter mounted intermediate the ends thereof and having a pair of juxtaposed current transformers associated therewith and adapted for overlapping differential protective relaying.

As well known by those skilled in the art, it is desirable in circuit interrupter equipment to distinguish between an external fault, which does not affect the reliability of operation of the circuit interrupter, and an internal fault within the circuit interrupter, which the circuit interrupter itself cannot clear. This is particularly true of bus-tie breakers. In the former case, an external fault may be a line fault, bus fault or bushing-flashover fault which does not affect the integrity of the bus-tie breaker. Here it is necessary to open only the bus-tie breaker and the remote circuit breakers connected to lines which connect to the bus section on the fault side of the bus-tie breaker. This will isolate the fault, yet will not interfere with power transmission on the bus section situated on the unfaulted side of the bus-tie breaker. Thus, insofar as possible, the electrical continuity of the system is maintained with only the fault portion of the system isolated.

However, in contrast to the external fault condition described above, in the case of an internal fault, which the bus-tie breaker itself cannot clear, and which impairs the integrity of the bus-tie breaker, it is here necessary to open not only the bus-tie breaker itself, but also all breakers controlling electrical circuits connected to the two bus sections on both sides of the bus-tie breaker, thus completely de-energizing all circuits connected to the bus-tie breaker.

Therefore, from the above, it is evident that the bus-tie circuit breaker must be provided with means for distinguishing between those faults occurring within the bus-tie breaker itself and those faults occurring external to the bus-tie breaker.

In protective relay systems designed to carry out the aforesaid functions, for instance differential protective systems, it is customary to utilize current transformers mounted in "overlapping" relationship. That is, the current transformer means protecting one portion of the electrical system extends into, or overlaps into, a portion of the electrical system protected by a second current transformer means.

The physical location of the overlapping current transformers at opposite ends of the internal circuit extending through the circuit interrupter is an important feature of the conventional overlapping differential protective system. Thus, with overlapping protective equipment it is possible to distinguish between faults occurring in the zone of the electrical circuit between the overlapping current transformers and those faults occurring outside of this zone. Thus, the effectiveness of this prior-art arrangement of distinguishing between faults at any point in the internal circuit of the breaker and those external thereto depends upon whether the zone of the electrical circuit between the overlapping current transformers can be made coextensive with the internal circuit of the breaker; that is, the internal circuit of the breaker is included in the protective zones of both differential protective systems.

In the case of the conventional dead-tank oil circuit interrupter having terminal bushings extending downwardly into a grounded tank enclosing the two interrupting units bridged by the usual crossbar, the mounting of the current transformers about the terminal bushings obviously provides the desired coextensiveness of the aforesaid zone between the overlapping transformers and the internal circuit through the interrupter.

However, certain types of circuit interrupters due to cost and space considerations, do not lend themselves readily to the positioning of the current transformers at the breaker terminals in such a manner as to achieve overlapping of the protective systems to include the breaker internal circuit. In such cases, if the current transformers are supported on the breaker with their usual metallic supporting parts grounded in the conventional manner, the protective system or systems will be incapable of distinguishing between faults external to the breaker, and those faults internal to the breaker which occur outside the overlapping zone between the current transformers.

When the current transformers are located on only one side of the interrupter, protection for breaker internal faults depends on backup relaying elsewhere in the system; however, backup relaying may be slow or inadequate. There may be cases where additional, separately mounted current transformers are required to obtain the desired protective relaying. This, however, is expensive as it involves additional equipment, which must be adequately supported and insulated for the voltage employed. For faults external to the breaker, the relative location of the current transformers within the breaker is of no consequence.

Three important objections to the reliance upon backup relaying for internal breaker faults are: (1) system transient stability may become critical due to the longer operating time of backup relays; (2) the longer the duration of the fault the greater the damage to the faulted breaker; and, (3) the rest of the substation may become endangered due to the longer fault duration. For cases where system stability or proper backup relaying cannot be provided on breakers having current transformers on only one side of the interrupter, separately mounted current transformers can be used to obtain the desired protective relaying. As mentioned, however, this is expensive and involves more equipment.

A general object of the present invention is to provide an improved current transformer mounting arrangement.

Another object of the present invention is to provide an improved current transformer mounting construction for a circuit interrupter of the type utilizing a single terminal bushing.

Another object of the invention is to provide an improved single-bushing type of circuit interrupter, in which the circuit interrupting elements are disposed adjacent one end of the terminal stud extending through the terminal bushing, and a mounting support for the circuit interrupter is disposed adjacent the mid-portion of said single terminal bushing.

Another object of the invention is to provide improved supporting shielding structure associated with a pair of overlapping current transformers disposed adjacent the mid-portion of the single terminal bushing associated with a single terminal bushing type of interrupter, with the interrupting element, or elements, disposed at one end of the terminal stud extending through said terminal bushing.

Still a further object of the present invention is to provide an improved mounting and shielding arrangement for a pair of overlapping current transformers disposed adjacent the mid-portion of the terminal bushing utilized in a single-terminal-bushing type of interrupter, so that internal faults within the interrupter will be properly relayed to effect opening of the circuit interrupter itself, as well as all remote circuit interrupters controlling electrical circuits connected to the bus sections on both sides of said single bushing type of circuit interrupter; whereas external faults associated with the single-bushing type of circuit interrupter will be properly relayed to effect only the opening of said single terminal bushing type of circuit interrupter together with only those remote circuit breakers controlling lines connected to the bus section only on the faulted side of the single terminal bushing type of circuit interrupter.

Further objects and advantages will readily become apparent upon reading the following specification, taken in conjunction with the drawings, in which:

FIGS. 2A–2D collectively illustrate, in vertical cross-section, a circuit interrupter of the single-bushing type employing the improved overlapping current transformer mounting construction of the present invention, with the contact structure being illustrated in the open-circuit position; and, FIG. 3 is a fragmentary, vertical sectional view taken substantially along the line III—III of FIG. 2C.

Figure 1:
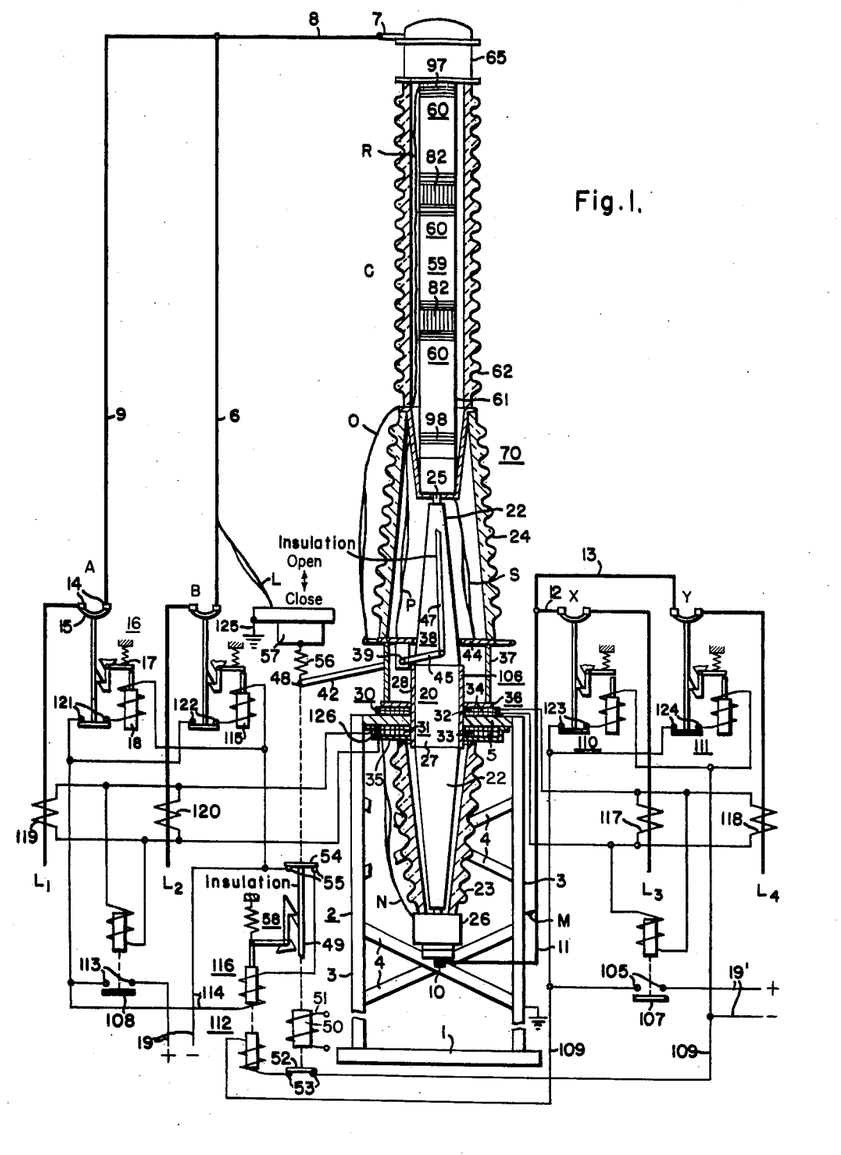
FIGURE 1 is a view partly in schematic form and partly in section, showing a possible type of circuit interrupter and an electrical system therefor embodying the present invention, the interrupter being shown in the closed-circuit position.

Referring to the drawings, and more particularly to FIG. 1 thereof, the reference numeral 1 designates a suitable base, which may be of concrete, which supports an upstanding angle-iron framework, generally designated by the reference numeral 2, and including a plurality of angle-iron uprights 3, which may be interbraced by diagonally extending angle-iron supports 4, only fragmentarily shown.

Disposed at the upper end of the upstanding angle-iron framework 2 is a horizontally extending apertured grounded support plate 5, which may be suitably secured, as by welding, or by bolted connections, to the upper extremities of the angle-iron vertical supports 3. The apertured support plate 5 is employed to fixedly secure into position a single-terminal bushing type of circuit interrupter, designated by the reference letter C, the internal construction of which is more clearly shown in the sectional views illustrated in FIGS. 2A and 2D collectively.

It will be observed with reference to FIG. 1 that the upper terminal portion 7 of the interrupter C has a bus section 8 connected thereto which, in turn, is connected by conductors 6, 9 through remote circuit breakers A and B to other remote circuits. The remote circuit breakers A, B thus control lines $L_1$ and $L_2$.

The other, opposed, lower terminal portion 10 of the single-terminal-bushing circuit interrupter C has connected thereto a bus section 11, which is connected to remote circuit breakers X and Y by electrical conductors 12, 13. The remote circuit breakers X and Y control remote circuits $L_3$ and $L_4$. Some of these electrical circuits $L_1$, $L_2$, $L_3$, and $L_4$ may be feeder circuits for supplying electrical energy to a bus section, or may be distribution circuits for supplying electrical energy from a bus section to a load. The circuit breakers A, B, X and Y are shown only schematically in FIG. 1 since they may be of any conventional type. Since all of these circuit breakers may be substantially identical, it is considered necessary to describe only a single one. More particularly, circuit breaker A, located at one side of the bus-tie breaker C, includes a pair of fixed contacts 14 adapted to be bridged by a movable bridging contact 15, which is biased toward an open position, and is latched in the closed position shown by a latching mechanism 16. Latch 17 of the latching mechanism 16 is biased toward latching position, and is motivated to the tripped position by means of an electromagnetic device or tripping solenoid 18, which may derive energy from a tripping source, which preferably is a direct-current source, indicated at 19. For simplicity, the breakers X and Y on the opposite side of the bus-tie breaker C, are shown as having their trip mechanism operable from a separate tripping source 19', but it is obvious that all of the breaker trip mechanisms could be operated from a single supply source.

The bus-tie breaker or circuit interrupter C is of the single terminal bushing type, that is, including only a single terminal bushing, which is preferably supported adjacent the mid-portion thereof, as illustrated in FIG. 1.

The present invention is described as being applied to a circuit interrupter of the single terminal bushing type, as more fully described in U.S. patent application filed December 6, 1957, Serial No. 701,226, by Benjamin P. Baker, and assigned to the assignee of the instant application. FIGS. 2A–2D illustrate, collectively, a vertical, cross-sectional view through the circuit interrupter C with the contact structure shown in the open-circuit position. For the purpose of understanding the present invention, it will be necessary only to sketchily describe the internal component elements constituting the circuit interrupter C, and for a more particular and detailed description of the several parts, and a more complete description of the arc-interruption process therefor, reference may be had to the aforesaid Baker application.

Generally, the circuit interrupter C includes a single terminal bushing, generally designated by the reference numeral 20. For very low voltage ratings, condenser foils or layers 20a (FIG. 2C) may not be required, but for the higher voltage ratings condenser foils 20a are desirable within the wrappings 21, the latter collectively making up the body portion 22 of the terminal bushing 20. The invention is particularly adaptable for use with the higher voltage ratings where condenser foils 20a are very desirable, since they give accurate control of the potential gradient.

However, it is to be clearly understood that the present invention is not confined in its application to high-voltage circuit interrupters, but is applicable, in many of its aspects, to lower-voltage circuit interrupters.

The circuit interrupter C, here described, however, is particularly adapted to a transmission line voltage of 230 kv. and has an interrupting capacity of 15,000 mva. As illustrated more fully in FIGS. 2B–2D the lower portion of the circuit interrupter C includes a pair of hollow, tapered, porcelain, weatherproof shells 23, 24 maintained under compression by the terminal bushing 20, the latter having a terminal stud 25 extending longitudinally and axially through the body portion 22 thereof. With reference to FIG. 2D, there is illustrated a cap assembly 26, shown in side elevation, and enclosing a compression-spring assembly, which places the porcelain shells 23, 24 under compression, as well understood by those skilled in the terminal-bushing art. Encircling, and electrically connected to the grounded, outermost condenser foil layer 27 of the terminal bushing 20, by a connection 27a, is a supporting sleeve 28, which may be secured, as by welding, or the like, to a short support sleeve 29, the latter being secured, as by welding, to the apertured support plate 5.

The connection 27a insures that all of the voltage stress within the terminal bushing 20 will be imposed upon solid insulation and not upon air or gas, which might become ionized and eventually break down.

Disposed on opposite sides of the support plate 5 is a pair of current transformers, generally designated by the reference numeral 30—31. Each current transformer 30, 31 includes a toroidal winding 32 or 33 wound about an annular or tubular core 34 or 35, the latter encircling the terminal bushing 20. Preferably the current transformers 30, 31 are of the differential overlapping type, as more fully described hereinafter.

Disposed above the current transformer assembly 36, comprising both the aforesaid current transformers 30, 31 is a grounded, substantially box-shaped housing, designated by the reference numeral 37, and enclosing the crank mechanism 38 of the circuit interrupter C. The crank mechanism 38 includes a shaft 39, which extends through a side plate 40 (FIG. 2C) of the housing 37, within a sealing grommet 41, and is actuated externally of the mechanism housing 37 by a crank-arm 42 (FIG. 1).

The operating shaft 39 is supported upon a pair of bifurcated brackets 43 secured, as by welding, to an apertured support plate 44. Keyed to the operating shaft 39 is a pair of crank arms 45, having pivotally connected to their outer, swinging ends the rod-ends 46 of a pair of insulating operating rods 47, which extend upwardly, interiorly within the upper porcelain shell 24, and serve to effect longitudinal, reciprocating motion of the movable contact assemblage of the interrupter C, more fully described hereinafter.

As more fully illustrated in FIG. 1, the external operating crank 42 is pivotally connected, as at 48, to an insulating operating rod 49. Adjacent the lower end of the insulating operating rod 49 is an armature 50, which may be moved downwardly, in the closing direction, by a closing solenoid 51 of the desired strength. Disposed at the lower extremity of the insulating operating rod 49 is a bridging contact 52, which bridges a pair of stationary contacts 53 to interrupt a tripping circuit, more fully described hereinafter.

The operating rod 49, in addition, carries a second bridging contact 54 which bridges, in the closed-circuit position shown in FIG. 1, a second pair of stationary contacts 55 in series with a second tripping circuit, described hereinafter. The upper end of the operating rod 49 is biased in the opening direction by a tension spring 56 secured at its upper end to a grounded support 57. The operating rod 49 is latched by a latching mechanism, generally designated by a reference numeral 58, in the closed-circuit position, as shown in FIG. 1, against the biasing action exerted by the tension spring 56.

The interrupting or extinguishing assemblage, generally designated by the reference numeral 59, supported at the upper end of the terminal stud 25 will now be described. Generally, the interrupting assemblage 59 includes a plurality of serially related arc-extinguishing units 60, more clearly shown in FIG. 2A. The arc-extinguishing units 60 are supported upon an insulating tension tube, designated by the reference numeral 61, and extending upwardly interiorly within an upstanding, weatherproof cylinder 62, preferably composed of porcelain and maintained under compression.

Figure 2A:
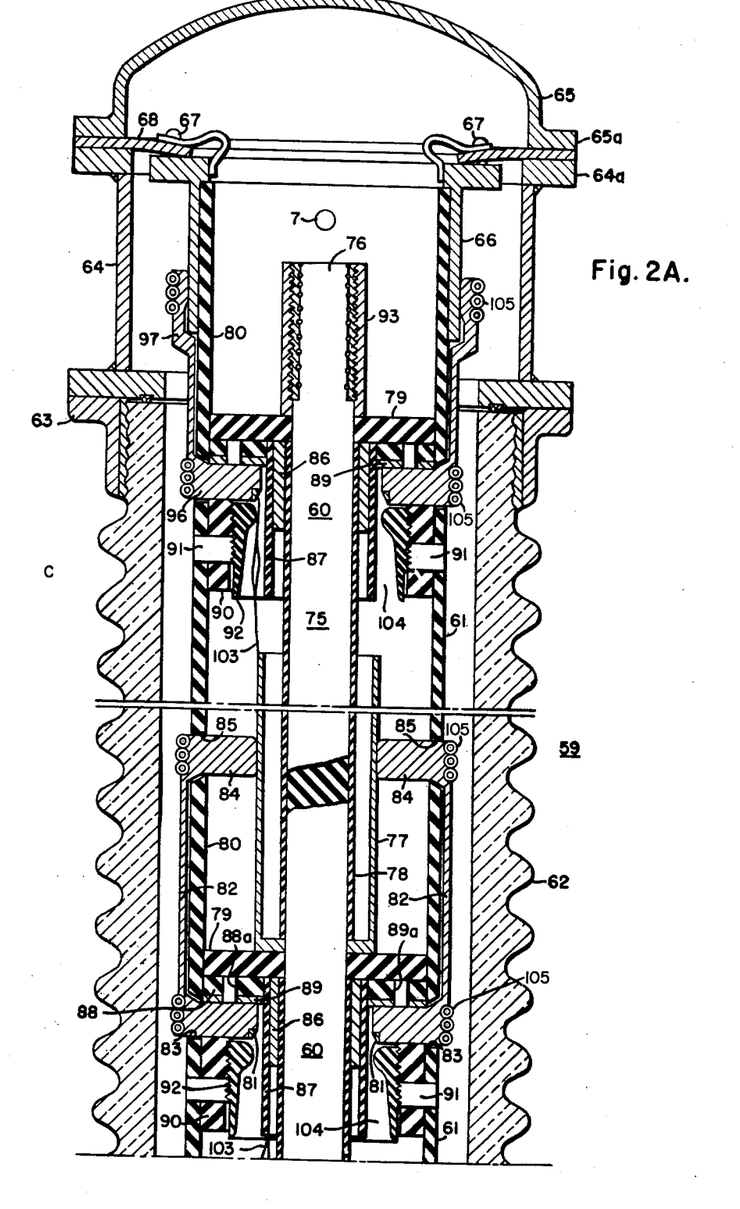
Figure 2B:
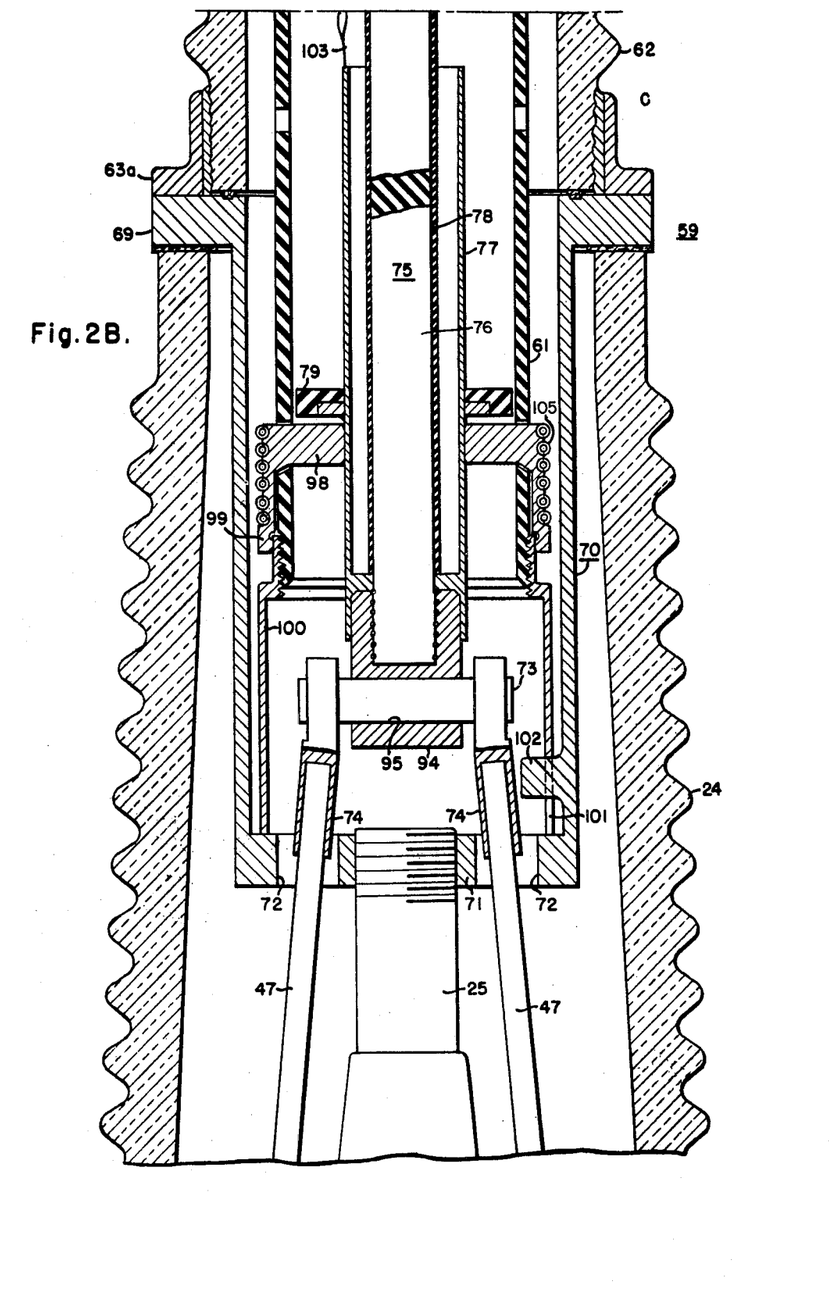

The upstanding porcelain cylinder 62 has a pair of flange rings 63, 63a cemented to its upper and lower ends as shown in FIGS. 2A and 2B. The upper flange ring 63 is secured, by means not shown, to a housing cylinder 64 supporting an upper closure cap 65. The upper end of the tension tube 61 has fixedly secured thereon, as by a press fit, a conducting end sleeve 66 (FIG. 2A), which is bolted, by bolts 67, to a compression ring 68, the latter being interposed between a flange portion 65a of closure cap 65 and an outwardly extending flange portion 64a disposed at the upper end of housing cylinder 64. It will be noted that tightening of the bolts 67 will effect through the compression ring 68, compression through the porcelain casing 62 with consequent tension being imposed upon the tension tube 61.

As shown more fully in FIG. 2B, the lower flange ring 63a is supported upon an outwardly extending flange portion 69 of a cylindrically-shaped, terminal-bushing, end clamp, generally designated by the reference numeral 70, and shown in FIG. 2B. The lower end of the terminal-bushing end clamp 70 has an apertured support plate portion 71, which is threadedly secured to the upper end of the terminal stud 25. The insulating operating rods 47 extend through openings 72 provided in the support-plate portion 71, being interconnected by a pin 73, extending through rod ends 74 affixed to the upper ends of operating rods 47 by a press fit. The actuating pin 73 effects longitudinal reciprocating opening and closing motion of a movable contact assemblage, generally designated by the reference numeral 75 and including an elongated insulating tie-rod 76. The insulating tie-rod 76 has a plurality, in this particular instance three, movable tubular contacts 77 secured thereto and movable therewith, being spaced along the tie-rod 76 by insulating spacing sleeves 78. In addition, the insulating tie-rod 76 carries therewith a plurality of ring-shaped, piston members 79 movable within operating cylinders 80, defined by the inner surface of the insulating tension tube 61.

The upper ends of the movable tubular contacts 77 cooperate with the lower ends 81 of a plurality of U-shaped stationary bridging contacts 82. As shown in FIG. 2A, the stationary U-shaped bridging contacts 82 extend along the outer surface of the insulating tension tube 61, and have the lower end portions 81 thereof extending through a plurality of circumferentially-spaced openings 83 provided through the wall of the tube 61. In addition, the U-shaped bridging contacts 82 have upper radially inwardly extending portions 84 extending through additional openings 85 provided in tension tube 61, and making sliding contact with the next upper movable cylindrical contact 77.

To effect extinction of the arc established between one of the tubular movable contacts 77 and the inwardly extending stationary contact portion 81 of the U-shaped bridging contact 82 associated therewith, there is provided for each arc-extinguishing unit 60 a permanent magnet sleeve 86, secured by a press fit to an inner sleeve 87 composed of a suitable insulating material. When the porcelain casing 62 encloses a gas, such as sulfur hexafluoride or selenium hexafluoride, employed alone, or mixed with one of the following gases: air, helium, nitrogen, carbon dioxide, hydrogen, or argon, the insulating material is preferably polytetrafluoroethylene, as described and claimed in U.S. Patent 2,757,261, issued July 31, 1956, to Harry J. Lingal, Thomas E. Browne, Jr., and Albert P. Strom, and assigned to the assignee of the instant application.

The upper end of each inner insulating sleeve 87 is preferably threadedly secured to an apertured retainer ring 88, having openings 88a provided therein, and communicating with the adjacently disposed operating cylinder 80. Disposed below each insulating retainer ring 88 is a magnetic apertured ring 89, having holes 89a provided therein, which register with the holes 88a provided in retainer ring 88. The retainer ring 88 and the abutting magnetic ring 89 are fixedly secured relative to the insulating tension tube 61 by a plurality of insulated bolts, not shown, which extend between the spaced stationary contact portion 81 of the circumferentially-spaced U-shaped bridging contacts 82, in a manner shown in the aforesaid Baker application. The lower ends of such bolts, not shown, are threadedly secured to an outer retainer sleeve 90, secured by pins 91 fixedly to the tube 61. In addition, the insulating retainer sleeve 90 threadedly secures, in a stationary position, an outer orifice ring 92, which preferably is composed of polytetrafluoroethylene, when one of the aforesaid gases is employed within casing 62.

The upper end of the insulating tie-rod 76 has a clamping sleeve 93 threaded thereon. The lower end of the insulating tie-rod 76 has threadedly secured thereto a metallic fitting 94 (FIG. 2B), having a laterally extending bore 95, through which extends the actuating pin 73.

The uppermost stationary contact fingers 96 have associated therewith finger portions 97, which bear along the outer side of the end sleeve 66. The lowermost contact fingers 98 (FIG. 2B) have finger portions 99 which bear against the outer side of a supporting end sleeve 100, having the lower end thereof slotted as at 101. Garter tension springs 105 maintain the several fingers 82, 97 and 99 into position. Hooks, not shown, are associated with the slots 101 of end sleeve 100 to removably engage with inwardly extending lugs 102, integrally formed with the terminal-bushing end clamp 70, so that the interrupting assemblage 59, including the tie-rod 76 and the encircling, insulating, tension tube 61 may be bodily removed upwardly and out of the porcelain casing 62 upon rotation of the lower supporting end sleeve 100 (FIG. 2B) to cause disengagement of the lugs 102 from the hooks, not shown, associated with slots 101 of supporting end sleeve 100, as described in detail in the aforesaid Baker application. This, of course, involves removal of upper closure cap 65 and prior unscrewing of mounting bolts 67 (FIG. 2A).

From the foregoing it will be apparent that, in the closed-circuit position illustrated in FIG. 1, the electrical circuit, extending through the interrupting assemblage 59, includes terminal stud, or terminal portion 7, housing cylinder 64, compression ring 68, end sleeve 66, fingers 97, stationary contact fingers 96, upper movable tubular contact 77, contact fingers 84, U-shaped bridging contacts 82, lower stationary contact fingers 81, lower movable tubular contact 77, and in like manner through the sets of U-shaped bridging contacts 82 to the lowermost movable tubular contact 77 to lowermost contact fingers 98. The circuits then extend through finger portion 99 (FIG. 2B) to conducting, supporting, end sleeve 100, through hook portions, not shown, associated with slots 101, through conducting lug portions 102 of cylindrically-shaped, terminal-bushing end clamp 70 through support plate portion 71 thereof, to the upper end of terminal stud 25. The circuit then continues downwardly, interiorly through condenser terminal bushing 20 to the lower terminal portion 10 of lower cap assembly 26 (FIGS. 1 and 2D).

The interrupting operation of the interrupting assemblage 59 will now be described. To effect the closing of the interrupter C, as shown in FIG. 1, the operating rod 49 (FIG. 1) is moved downwardly by energization of closing solenoid 51. This will rotate external crank-arm 42 in a counter-clockwise direction, as viewed in FIG. 1, tensioning the tension spring 56 and effecting counter-clockwise rotative motion of operating shaft 39. The crank-arms 45, being keyed to the shaft 39, are likewise rotated in a counter-clockwise direction, as viewed in FIG. 1, to effect thereby an upward thrust upon the pair of insulating, interiorly disposed, operating rods 47.

The upward motion of the operating rods 47 (FIG. 2B) effects upward movement of actuating pin 73, and hence upward closing movement of insulating tie-rod 76, together with all of the tubular movable contacts 77 secured to and movable therewith. This will cause substantially simultaneous contacting engagement between the upper ends of each of the several tubular movable contacts 77 and the relatively stationary contact fingers 81, 96 (FIG. 2A). The circuit will then be closed through the interrupter C and the latching mechanism 58 (FIG. 1) will maintain the contact structure closed.

To effect the opening operation of the interrupter C to the fully open-circuit position, shown in FIGS. 2A–2D, suitable means, hereinafter described, will effect the unlatching of latching mechanism 58 (FIG. 1) to permit thereby the tension spring 56 to effect upward opening movement of the insulating operating rod 49 and hence clockwise rotation of external crank-arm 42 and operating shaft 39 (FIG. 1). This will correspondingly effect clockwise rotation of internal crank-arms 45 and hence downward, opening motion of both insulating operating rods 47. With reference to FIG. 2B, it will be apparent that downward motion of operating rods 47 will effect through the actuating pin 73 and lower end fitting 94, downward opening motion of insulating tie-rod 76, carrying therewith all of the movable tubular contacts 77.

The downward opening separating motion of each movable tubular contact 77 will establish an arc 103 within each arc-extinguishing unit 60, as shown in FIGS. 2A and 2B. Although FIGS. 2A and 2B illustrate the position of the several parts in the fully open-circuit position, nevertheless, for purposes of illustration, the arc 103 has been drawn in these figures. The permanent magnet sleeve 86, associated with each arc-extinguishing unit 60, will set up a radial magnetic field within the annular orifice 104, defined by the inner and outer insulating sleeves 87, 92, to effect the rotation of the arc 103 around the upper periphery of each movable tubular contact 77. Thus, each arc 103 will rapidly be moved around the annular orifice 104, while being simultaneously subjected to a downward passage of gas through the annular orifice 104, as brought about by the downward motion of each ring-shaped piston 79 moving within its surrounding operating cylinder 80.

The combined rotation of the arc 103, as effected by the radial magnetic field, in conjunction with the axial blast of gas, as brought about by the downward motion of the several ring-shaped piston members 79, quickly brings about arc extinction. Continued downward movement of the tie-rod 76 carries the several parts to the fully open-circuit position as illustrated in FIGS. 2A–2D.

Figure 2C:
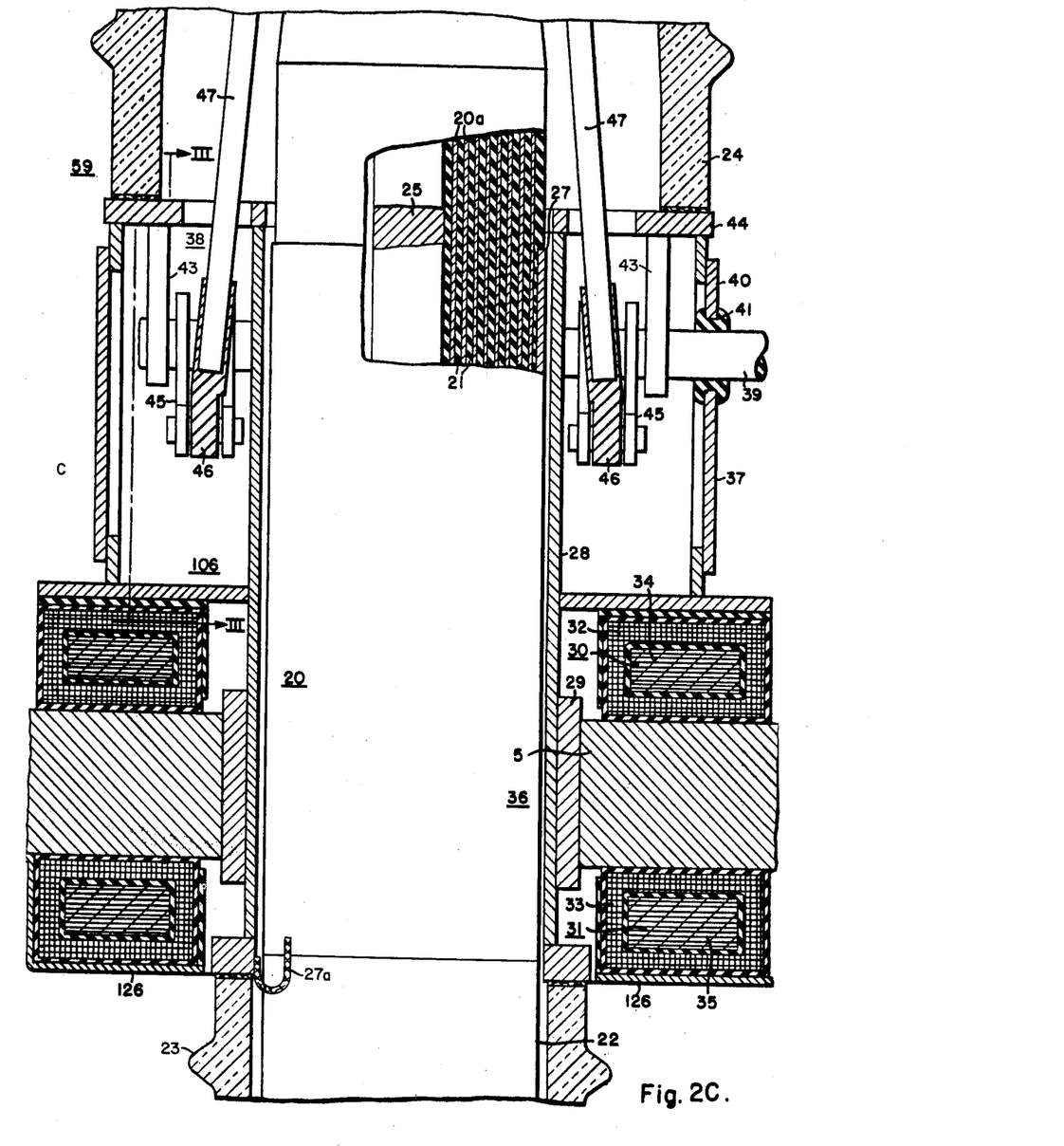
Figures 2D, 3:
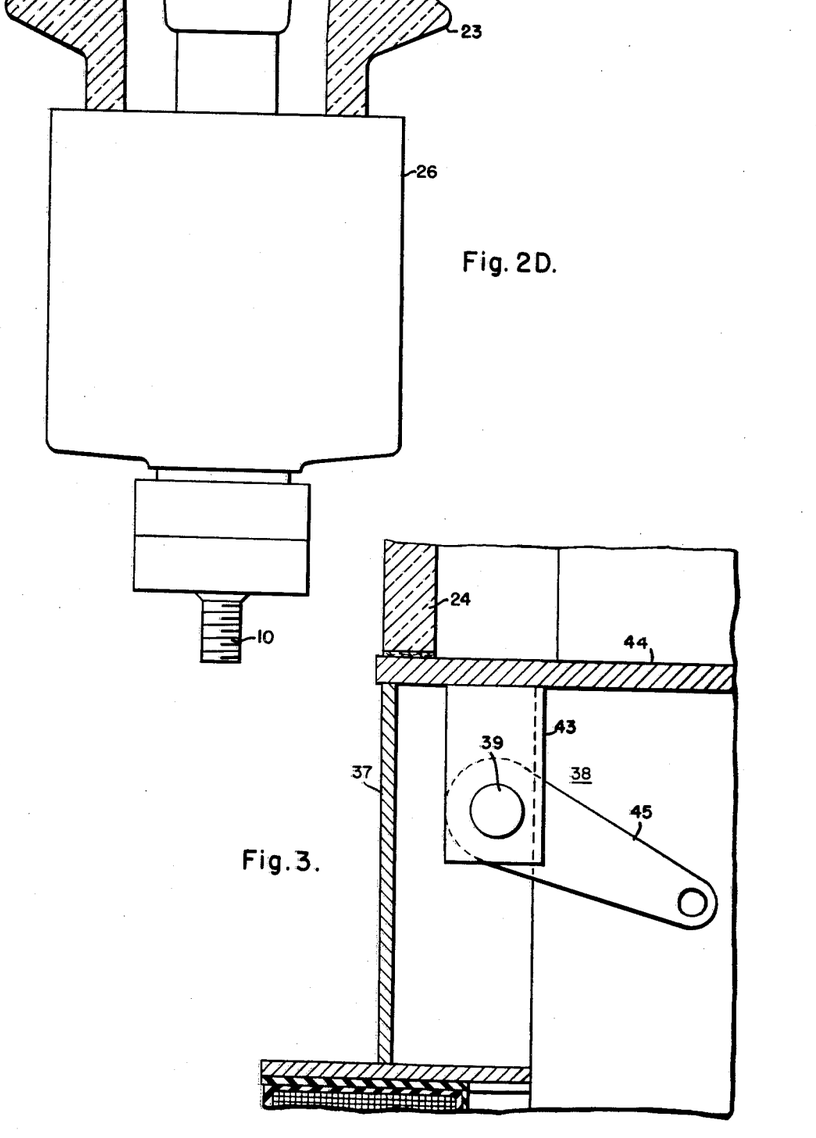

With reference to FIGS. 1 and 2C, it will be noted that there is provided supporting conducting shield structure, generally designated by the reference numeral 106, such that any internal fault extending along the surface of upper porcelain shell 24 (fault O of FIG. 1) or extending interiorly of porcelain shell 24 (fault P of FIG. 1), in conjunction with breakdown path R, will have a current path to ground, which will extend between the current transformers 30, 31 of the current transformer assembly 36. More particularly, the supporting conducting shield structure includes the box-shaped housing 37, the supporting sleeve 28, and short axial support sleeve 29 (FIG. 2C). The shield structure 106 is, of course, electrically connected to conducting support plate 5, which extends to ground through the grounded, vertical angle-iron uprights 3 (FIG. 1) of supporting framework 2.

Inspection of the current-transformer assembly 36, with reference to FIG. 1, makes it apparent that the primary circuit of the current-transformer secondary windings 32, 33 normally comprises terminal stud 25 extending axially through terminal bushing 20. Accordingly, current flow through terminal stud 25 normally induces a current flow in both secondary windings 32, 33. Effective current flow through supporting conducting shield structure 106 and support plate 5 extending between secondary windings 32, 33 to ground, similarly induces a current flow in the secondary winding 32 of current transformer 30. However, current flow through the conducting shield structure 106 and support plate 5 occurs only under internal fault conditions, such as for example, indicated at O, P or S in FIG. 1. However, under such internal fault conditions, the conducting shield structure 106 would, in effect, constitute a portion of the primary circuit for the upper current transformer 30.

If there should occur an internal breakdown along the interrupting assemblage 59, as indicated by the internal fault R, this fault current flowing through the conducting shield structure 106 and plate 5 between current transformers 30, 31 to ground, would induce a current in the secondary winding 32. Thus, the current paths formed either by terminal stud 25, or by conducting shield structure 106, are inductively linked with the secondary winding structure 32. As for external fault currents flowing to ground as illustrated at L, M, or N of FIG. 1, these fault currents have no magnetic effect on the secondary windings 32, 33, and hence such external fault currents are considered to flow to ground through a breakdown path, which is essentially independent of inductive linkage with the secondary windings 32, 33.

In order to protect the electrical system shown in FIG. 1, normally open differential relays 107, 108 are provided for selectively, or collectively controlling tripping of the circuit breakers included within the system. For this purpose differential relay 107 includes contacts 105, which, when closed, establish a tripping circuit, indicated at 109, for the tripping means associated with circuit breakers X, Y and C. For example, closure of contacts 105 connects the tripping means 110, 111 of circuit breakers X and Y respectively across the tripping source 19' and, similarly, connects a tripping means 112 of circuit breaker C across tripping source 19'.

In a similar manner, differential relay 108 includes contacts 113, which, upon closure, are adapted by means of a tripping circuit, generally shown at 114, to connect the tripping means 18, 115 and 116 across tripping source 19, in response to which breakers A, B and C will be tripped open.

Energization of differential relay 107 is effected from a differential circuit including current transformer secondary windings 32, 117, 118, which are energized in accordance with the current flowing in their respective primaries, which, under normal conditions, are conductors 25, $L_3$ and $L_4$. The circuit including the transformer windings 32, 117, 118 is constructed in a well-known manner so that under normal conditions, that is, when there is no fault in the power circuit disposed between the transformer secondaries, no effective current will flow in the winding of differential relay 107. The differential relay 107 is energized in accordance with the difference between effective current flowing in the primary conductors 25, 106 of winding 32 and the sum of the currents flowing in the primaries $L_3$ and $L_4$ of windings 117 and 118, respectively. The operation of differential relay arrangements of this general type is well understood in the art, and it is apparent that other well-known differential relay arrangements could equally well be used.

Energization of differential relay 108 is effected from a circuit including current transformer secondary windings 33, 119, 120. The winding of differential relay 108 is connected in this circuit in the same manner as described with respect to differential relay 107. Similarly, it will be understood that differential relay 108 will be energized in accordance with the difference between the effective current flowing in the primary conductor 25 of secondary winding 33 and the sum of the currents flowing in the primaries $L_1$ and $L_2$ of secondary windings 119 and 120, respectively.

It is apparent from the illustration in FIG. 1 that the current transformers 30, 31 of the current-transformer assembly 36 are mounted in overlapping relationship. That is, current transformer winding 32, which forms a part of the current-transformer means 30, 117, 118, protecting one portion of the system, extends into, or overlaps into, the portion of the system protected by the second current transformer means 31, 119, 120. Thus, the current transformer winding 33 is located in that portion of the internal circuit between lower terminal portion 10 and the current transformer winding 32. Similarly, the winding 32 is located in that portion of the primary power circuit including terminal portion 7 and extending between windings 119, 120 and secondary winding 33.

The tripping circuits 109 and 114 preferably contain means for deenergizing the tripping solenoids after the solenoids have effected opening of their associated circuit breakers. To this end, contacts 121, 122, 123 and 124 are provided in the tripping circuits of the breakers A, B, X and Y, respectively. From the drawing of FIG. 1, it will be obvious that each of these contacts will be opened in response to opening of the associated breaker, thereby deenergizing the associated trip means. In a similar manner, contacts 52 and 54 are provided in the tripping circuit for the breaker C, and are adapted to be opened in response to tripping of breaker C, thereby deenergizing tripping means 112, 116.

The operation of the above-described protective equipment will now be described. As has been previously stated, faults in the internal circuit of the circuit breaker are likely to be faults, which the breaker itself cannot clear; therefore, all of the associated breakers must be relied upon to clear the fault so as to prevent current from being fed from either of the bus sections 8, 11 into the fault. Under such conditions, it is, therefore, necessary to open, in addition to the bus-tie breaker C itself the breakers connected to the bus sections 8, 11 on both sides of the bus-tie breaker. In contrast to the requirements of this internal fault condition, in the event of a fault external to the bus-tie breaker C, such as an insulation flashover to ground at L, M or N outside of the breaker housing, in order to clear the fault, the bus-tie breaker C and only those breakers on the fault side of the bus-tie breaker need be opened. Preferably, the electrical circuits on the unfaulted side of the breaker C should remain operatively connected to their bus section.

The above requirements for collectively operating all breakers in the case of an internal fault, and for selectively operating certain of said breakers in the case of an external fault necessitates that the current transformers associated with the circuit breaker be capable of distinguishing between internal and external faults. As more fully brought out hereinafter, the novel construction and supporting arrangement of the current transformers 30, 31 of the present invention effectively fulfills these requirements.

Assume that a fault should occur at L, i.e., an external fault, or insulation flashover on the bus section 8 side of the bus-tie breaker C. Under such conditions, it would be necessary to open only the bus-tie breaker C and breakers A and B on the fault side of breaker C, while leaving the breakers X and Y closed. If current be assumed to be flowing into the bus-tie breaker C from terminal 10 to terminal 7 at the instant the fault L begins, it is apparent that there will be a difference in the current flowing through conductor 25 and the sum of the currents in circuits $L_1$ and $L_2$, since at least a portion of the current flowing through conductor 25 is fed into the fault. This difference in current flow will be detected by the current transformer windings 33, 119 and 120, which will effect operation of differential relay 108, which, in turn, effects energization of trip means 18, 115 and 116. Thus, it will be seen that breakers A and B and the bus-tie breaker C will be opened, as required. It will also be apparent that differential relay 107 will not be affected by the fault L, and hence, breakers X and Y will remain closed, as is desired. This is the case because, since the fault is at L, the fault current flowing through the conductor 25 will equal the sum of the fault currents flowing through electrical circuits $L_3$ and $L_4$. The condition for effecting the opening of differential relay 107 is, therefore, not met.

If the fault be assumed to be located at the opposite external side of the bus-tie breaker C, that is, at M or at N instead of at L, operation of differential relay 107 will be effected, but relay 108 will remain deenergized, and as a result only circuit breakers X and Y on the fault side of the bus-tie breaker C, and the bus-tie breaker C itself will be tripped open. The reason that differential relay 107 will operate is, of course, because the primary current through conductor 25 is no longer equal to the sum of the currents in conductors $L_3$ and $L_4$, and so the sum of the secondary currents through secondary windings 32, 117, 118 is no longer equal to zero. The reason that differential relay 108 remains inactive is because the fault current at fault N or M flows to ground through the auxiliary or secondary grounding shield structure 126, connected directly to ground plate 5, and so there is no effect on the secondary winding 33 from this fault current at fault N or at M. Thus, it is apparent that for external faults the protective equipment of the present invention will selectively isolate the faulted portion of the electrical system.

With respect to internal faults, an essential characteristic of prior-art differential protective arrangements is that the zone of the electrical circuit between the secondary windings of the current transformers is coextensive with the internal circuit of the breaker. So long as it is practical to make this zone coextensive with the internal circuit of the circuit breaker, the prior-art arrangement could distinguish between external and internal faults. However, in certain types of circuit breakers, it is not practical, because of cost or space requirements to mount the current-transformer windings in location which would produce the desired coextensiveness. In such cases, if the current transformers have conducting supporting parts grounded, as in the manner of conventional current transformers, the current transformers cannot distinguish between faults external to the breaker, and those in the internal circuit of the breaker, but outside of the zone between the two overlapping current transformer windings.

The present invention relates to a current transformer mounting construction for circuit interrupters and particularly applicable to a single-bushing type of circuit interrupter, in which it is possible to disregard the co-extensive relationship previously required, and hence to mount the overlapping current transformers in a simple, inexpensive and rugged manner.

By constructing the current transformers in accordance with the present invention, this simple and inexpensive mounting may be attained without affecting the ability of the overlapping current transformers to distinguish between external and internal faults. To attain this end there is provided the conducting grounding shield 126 and conducting supporting shield structure 106, previously described, which insures that any internal fault current extending through bus-tie breaker C passes to ground between the secondary current transformer windings 32, 33. In addition, there is provided the grounded conducting second shielding structure 126 insuring that any external fault extending from lower terminal 10 to ground will pass along a path, which is inductively independent of lower current transformer winding 33. This is attained by conductively associating the auxiliary or second conducting shielding structure 126 directly with the grounded supporting plate 5, as shown in FIGS. 1 and 2C.

It is essential to remember that in a single-bushing type of circuit interrupter utilizing a single-terminal bushing that at least a portion of the mounting for the circuit interrupter, as a whole, is generally disposed adjacent the mid-portion of the terminal bushing. In accordance with the present invention, the apertured supporting plate 5, which constitutes a part of the support for the circuit interrupter C, as illustrated in FIG. 1, has the current transformer secondary windings 32, 33 disposed at opposite sides thereof. The supporting conducting shielding structure 106 insures that any internal fault currents will pass between the current transformer windings 32, 33 and not independently thereof, and therefore assurance is had that any internal fault such as O or P or S, in conjunction with R, will have a current path to ground between the current transformer secondary windings 32, 33, and will, as a consequence, insure that all circuit breakers associated with the bus sections 8, 11 will be opened in addition to the bus-tie breaker C itself.

Assume, for example, that due to an accumulation of surface dirt, constituted by carbon particles, or other somewhat contaminating agents, a conducting path is formed along either the inner or outer sides of the upper cylindrical porcelain shield 62. Or assume that the surface of the tension tube 61 becomes somewhat contaminated with dirt or carbon particles, so that breakdown occurs lengthwise along the interrupting assemblage 59 as indicated at R. It is obvious upon an inspection of FIG. 1, that any breakdown path along the assemblage 59 at R will be followed by a breakdown to ground at P or S which will include the conducting shielding structure 106; but as has been stated heretofore, the supporting conducting shielding structure 106 is so arranged as to insure that the conducting path for the fault current will lead to ground between the two current transformer secondary windings 32, 33 and this will insure opening all of the breakers A, B, C, X, and Y.

More particularly, assume that an axial breakdown occurs along the assemblage 59 as indicated by the breakdown path R in conjunction with the breakdown path P. As noted hereinbefore, this breakdown path will lead to ground between the secondary windings 32, 33. Assume further that power flows from circuits $L_1$ and $L_2$ through the interrupter C from terminals 7 to 10 and on through bus section 11 to feeder circuits $L_3$ and $L_4$. Since under these conditions the secondary winding 33 will have zero fault-produced current induced therein, and since secondary windings 119 and 120 will have full fault-produced current induced therein, it is apparent that differential relay 108 will be energized to effect opening, in a manner previously described, of breakers A, B, and C. Since secondary winding 32 is inductively linked with the fault current passing to ground through the conducting shielding structure 106, it will have an effective current induced therein, whereas the secondary windings 117, 118 associated with lines $L_3$ and $L_4$ respectively will have zero fault-produced current induced therein. Thus, differential relay 107 will consequently be energized, and this will effect the opening of remote circuit breakers X and Y as well as the bus-tie breaker C. Thus, it will be apparent that under internal fault conditions all of the breakers connected to the bus sections 8, 11 will be tripped open, as is desired.

Assume that power flows from feeder circuits $L_3$, and $L_4$ into the bus section 11, through the bus-tie breaker C into bus section 8 and through remote circuit breakers A and B to feeder circuit $L_1$ and $L_2$. Assume further that an internal fault takes place along the breakdown path S of FIG. 1. As previously pointed out, this internal fault S will cause the fault current to take a path through the conducting shield structure 106 to ground between the current transformer secondary windings 32, 33. Since full fault current passes through conductor 25, which is encompassed by secondary winding 33, a secondary current will be induced in winding 33. However, secondary windings 119 and 120 will have zero fault-produced current induced therein, and consequently differential relay 108 will be energized causing the opening of breakers A, B and bus-tie breaker C. The current passing upwardly through conductor 25 and through secondary winding 32 will double back through the secondary winding 32, thus in substance cancelling out the effect of the primary current flow from terminal 10 to fault S. Thus since there will be zero current flow in winding 32, yet full fault-produced current flow in both secondary windings 117, 118, the differential relay 107 will be energized, and will effect the opening of remote circuit breakers X and Y in addition to bus-tie breaker C. Consequently, all of the breakers connected to the bus sections 8, 11 will be opened under these internal fault conditions.

From the foregoing description it will be apparent that there is provided a novel and simple current-transformer mounting construction associated with a circuit interrupter, in which the mounting structure for the circuit interrupter extends between the current-transformer windings, and supporting conducting shielding structure is provided and so associated with the current transformer winding nearest the interrupting structure that an internal fault current is forced to flow to ground in a path between the secondary current transformer windings. In addition, second shielding structure 126 is associated with the current transformer secondary winding 33 remote from the interrupting structure such that a fault condition at this point will pass to ground independently of inductive linkage with either of the secondary windings.

As will be obvious, the aforesaid structure is particularly adapted for use with a single-bushing type of circuit interrupter in which the apertured grounding plate supporting the single terminal bushing extends between the current transformer windings.

As will be obvious, the two overlapping current transformers may be inexpensively mounted adjacent the grounded supporting plate 5 and yet will be able to distinguish reliably between internal and external fault conditions.

Although there has been illustrated in particular type of interrupting structure 60, it will be apparent to those fully understanding the invention, that the invention is not limited to the particular interrupting structure 60 illustrated, but is directed to the relationship of the current-transformer windings with respect to the interrupting structure, and various types of interrupting structures other than the particular interruption structure 60 disclosed as desired, to fulfill different interrupting requirements.

Although there has been shown and described a specific structure, it is to be clearly understood that the same was merely for the purpose of illustration, and that changes and modifications may readily be made therein by those skilled in the art, without departing from the spirit and scope of the invention.

We claim as our invention:

1. A circuit interrupter assembly of the single-bushing type including a terminal bushing having interrupting structure associated only adjacent one end thereof, grounded supporting means for supporting said single-bushing type of circuit interrupter adjacent the midportion of said terminal bushing, a pair of current transformers adapted for overlapping protective relaying encompassing said terminal bushing for measuring the current flow through the terminal stud of said terminal bushing, one of said pair of current transformers being disposed more closely to said interrupting structure than the other current transformer, supporting conducting shielding structure of generally tubular configuration for supporting the midsection of the terminal bushing, said supporting conducting shielding structure being extended toward said interrupting structure and so arranged relative to said one current transformer that any internal fault current adjacent said interrupting structure will be compelled to flow through said one current transformer in inductive relationship therewith, additional conducting means electrically connecting said supporting conducting shielding structure with said grounded supporting means electrically between said pair of current transformers, and second conducting shielding structure disposed relative to said other current transformer adjacent the other end of said terminal bushing such that external faults occurring adjacent this end of said terminal bushing will flow directly to ground independent of inductive linkage with said pair of current transformers.

2. The combination in a single-bushing type of circuit interrupter assembly of an elongated interrupting assemblage including one or more arc extinguishing units, an elongated hollow insulating casing enclosing said elongated interrupting assemblage, means including a single high-voltage terminal bushing having a terminal stud passing axially therethrough to assist in supporting said elongated interrupting assemblage at one end of said terminal stud, grounded means supporting said high-voltage terminal bushing adjacent the mid-portion thereof including a grounded conducting support, a pair of current transformers adapted for overlapping protective relaying encircling said terminal bushing, one current transformer being disposed more closely to said one end of said terminal stud than the other current transformer, supporting conducting shielding structure of generally tubular shape and extended toward said interrupting assemblage, said supporting tubular shaped shielding structure clamped to the midsection of the terminal bushing to support the same in position, said supporting shielding structure shielding said one current transformer such that internal fault currents occurring along said elongated interrupting assemblage will be forced to flow through said one current transformer, means electrically connecting said conducting shielding structure between said current transformers to said grounded conducting support, and second conducting shielding structure associated with the other current transformer such that external fault currents occurring adjacent the other end of said terminal stud will flow directly to said grounded conducting support independently of inductive linkage with said two current transformers.

3. The combination in a single-bushing type of circuit interrupter assembly of an elongated interrupting assemblage including one or more arc-extinguishing units, an elongated hollow insulating casing enclosing said elongated interrupting assemblage, means including a single high-voltage terminal bushing having a terminal stud passing axially therethrough to assist in supporting said elongated interrupting assemblage at one end of said terminal stud, means supporting said high-voltage terminal bushing adjacent the mid-portion thereof including a grounded conducting support and a supporting tubular shield structure extended toward said interrupting assemblage, a pair of current transformers adapted for overlapping protective relaying encircling said terminal bushing and located at opposite sides of said grounding conducting support, one current transformer being disposed more closely to said one end of said terminal stud than the other current transformer, said supporting tubular conducting shielding structure clamped to the mid-section of said terminal bushing and shielding said one current transformer such that internal fault currents occurring along said elongated interrupting assemblage will be forced to flow through said one current transformer, means electrically connecting said conducting shielding structure between said current transformers to said grounded conducting support, and second conducting shielding structure associated with the other current transformer such that external fault currents occurring adjacent the other end of said terminal stud will flow directly to said grounded conducting support independently of inductive linkage with said two current transformers.

4. A circuit interrupter assembly of the single-bushing type including a terminal bushing having interrupting structure associated only adjacent one end thereof, grounded supporting means for supporting said single-bushing type of circuit interrupter adjacent the midportion of said terminal bushing including a generally tubularly-shaped supporting clamping shield structure extending toward said interrupting structure, a pair of current transformers adapted for overlapping protective relaying encompassing said terminal bushing for measuring the current flow through the terminal stud of said terminal bushing, one of said pair of current transformers being disposed more closely to said interrupting structure than the other current transformer, said supporting conducting shielding structure being so arranged relative to said one current transformer and so extended that any internal fault current adjacent said interrupting structure will be compelled to flow through said one current transformer in inductive relationship therewith, and conducting means electrically connecting said supporting clamping conducting shielding structure with said grounded supporting means electrically between said pair of current transformers.

5. In a circuit breaker assembly, an insulating terminal bushing, a circuit interrupting element supported on one end of the insulating terminal bushing, said insulating bushing comprising a centrally located through conductor surrounded by insulation positioned on the conductor, a grounded supporting member supporting the conductor through the insulation thereon intermediate the ends of the bushing including a clamping tubular supporting conductingn shield member extended toward said circuit interrupting element, current transformer on either side of said grounded supporting member, said conducting clamping tubular shield member being disposed around the insulating material on the through conductor and connected to the grounded support whereby said current transformers differentiate between an internal fault to ground through said conducting supporting clamping shield member that would impair the operability of the breaker and an external fault which would not.

6. A circuit interrupter assembly of the single-bushing type including a terminal bushing having a plurality of insulating wrappings and condenser foil layers interspersed therein, interrupting structure associated only adjacent one end of said terminal bushing, grounded supporting means for supporting said single-bushing type of circuit interrupter adjacent the midportion of said terminal bushing including a tubular supporting shield clamped to the midportion of the terminal bushing, an electrical connection between said supporting tubular clamping shield and the outermost foil layer of said terminal bushing, a pair of current transformers adapted for overlapping protective relaying encompassing said terminal bushing for measuring the current flow through the terminal stud of said terminal bushing, one of said pair of current transformers being disposed more closely to said interrupting structure than the other current transformer, said conducting clamping supporting shield being so arranged relative to said one current transformer and extended toward said interrupting structure that any internal fault current adjacent said interrupting structure will be compelled to flow through said one current transformer in inductive relationship therewith, conducting means electrically connecting said conducting shield with said grounded supporting means electrically between said pair of current transformers, and additional second conducting shielding structure disposed relative to said other current transformer adjacent the other end of said terminal bushing such that external faults occurring adjacent this end of said terminal bushing will flow directly to ground independently of inductive linkage with said pair of current transformers.

7. A circuit interrupter assembly including a grounded apertured support plate, an elongated terminal bushing extending through the aperture of said support plate having a centrally disposed conductor stud passing therethrough, an interrupter element, means including one end of said stud for supporting said interrupter element only adjacent one end of said terminal bushing, a pair of current transformers adapted for overlapping protective relaying on opposite sides of the grounded support plate, a conducting elongated tubular breakdown shield extending along the terminal bushing an appreciable extent in the direction of said interrupter element and connected to said support plate, and said tubular breakdown shield supporting said elongated terminal bushing adjacent the midportion thereof, whereby internal flashover along the interrupter element will arc to the remote end of the elongated tubular breakdown shield and the resultant ground fault current will flow to ground between the pair of current transformers.

8. A circuit interrupter assembly including a grounded apertured support plate, an elongated terminal bushing extending through the aperture of said support plate having a centrally disposed conductor stud passing therethrough, an interrupter element, means including one end of said stud for supporting said interrupter element only adjacent one end of said terminal bushing, a pair of current transformers adapted for overlapping protective relaying on opposite sides of the grounded support plate, a conducting elongated tubular breakdown shield extending along the terminal bushing a substantial distance in the direction of said interrupter element and connected to said support plate, said tubular breakdown shield supporting said elongated terminal bushing adjacent the midsection thereof, whereby internal flashover along the interrupter element will arc to the remote end of the elongated tubular breakdown shield and the resultant ground fault current will flow to ground between the pair of current transformers, a second breakdown shield encompassing the current transformer disposed away from the interrupter element, and said second breakdown shield connected to said grounded support plate externally of the respective current transformer, whereby external flashovers will arc to ground independently of inductive linkage with the last-mentioned current transformer.

9. The combination in a single-bushing type of circuit-interrupter assembly of grounded supporting means, a high-voltage terminal bushing supported intermediate its ends by said grounded supporting means, a box-shaped mechanism housing and an internally-positioned tubular breakdown shield disposed to one side of the grounded supporting means and extending along the terminal bushing for the support thereof, said tubular breakdown shield having a clamping engagement to the central portion of said terminal bushing, an interrupting element including an insulating casing positioned beyond said housing and breakdown shield on said one side of the grounded supporting means, rotatable shaft means extending through a side wall of said mechanism housing to actuate the interrupter element, said casing abutting said housing, a pair of current transformers disposed on opposite sides of said grounded supporting means and encompassing said terminal bushing, said current transformers being adapted for overlapping protective relaying, and said supporting tubular breakdown shield providing a fault-current path to ground solely through the current transformer disposed on said one side of the grounded supporting means, whereby internal faults will strike the breakdown shield and pass to ground solely between the two current transformers.

10. The combination in a single-bushing type of circuit-interrupter assembly of grounded supporting means, a high-voltage terminal bushing supported intermediate its ends by said grounded supporting means, a box-shaped mechanism housing and an internally-positioned tubular breakdown shield disposed to one side of the grounded supporting means and extending along the terminal bushing for the support thereof, said tubular breakdown shield having a clamping engagement to the central portion of said terminal bushing, an interrupting element including an insulating casing positioned beyond said housing and breakdown shield on said one side of the grounded supporting means, rotatable shaft means extending through a side wall of said mechanism housing to actuate the interrupter element, said casing abutting said housing, a pair of current transformers disposed on opposite sides of said grounded supporting means and encompassing said terminal bushing, said current transformers being adapted for overlapping protective relaying, said supporting tubular breakdown shield providing a fault-current path to ground solely through the current transformer disposed on said one side of the grounded supporting means, whereby internal faults will strike the breakdown shield and pass to ground solely between the two current transformers, and a second breakdown shield encompassing the current transformer on the other side of the grounded supporting means to carry external fault currents to ground independently of inductive linkage with the two current transformers.

11. A circuit interrupter assembly including an extinguishing assemblage having means for establishing and extinguishing an arc, means for mounting the circuit interrupter assembly in position intermediate the ends thereof including a conducting grounded support, a pair of current transformers adapted for use in overlapping protective relaying, means positioning said pair of current transformers relative to said circuit interrupter assembly so that they will measure the current flow through the circuit interrupter assembly, supporting conducting generally tubular shielding structure for supporting said extinguishing assemblage and arranged relative to one of said current transformers such that internal fault currents within said circuit interrupter assembly will be compelled to flow through said generally tubular supporting shielding structure and said one current transformer in inductive relationship therewith, and additional conducting means for transmitting said internal fault current from said supporting generally tubular shielding structure between said two current transformers to said conducting grounded support so that they may detect an internal fault condition.

12. The combination in a circuit interrupter assembly of an extinguishing assemblage, said extinguishing assemblage including separable contact means for establishing an arc and extinguishing means for effecting the extinction of said arc, a pair of current transformers mounted on one side of said extinguishing assemblage and adapted for overlapping protective relaying and so disposed as to measure the current flow through said contact means, grounded supporting means for supporting said circuit interrupter assembly fixedly in position intermediate the ends thereof, the mounting of said pair of current transformers on one side of said extinguishing assemblage resulting in one current transformer being disposed nearer said contact means than the other current transformer, said grounded supporting means including a generally tubular supporting conducting shielding structure disposed interiorly of said current transformers and serving to support said extinguishing assemblage, said supporting conducting shielding structure being disposed relative to said one current transformer and extending toward said contact means sufficiently that internal fault currents adjacent said contact means will be forced to flow through said one current transformer in inductive relationship therewith, additional conducting means for carrying said internal fault current from said supporting shielding structure between said two current transformers so that they may detect such internal fault condition, and said additional conducting means carrying said internal fault current to said grounded supporting means.

References Cited in the file of this patent
UNITED STATES PATENTS

| | | |
|---|---|---|
| 2,163,559 | MacNeil | June 20, 1939 |
| 2,804,576 | Coggeshall | Aug. 27, 1957 |
| 2,804,577 | Roth | Aug. 27, 1957 |
| 2,866,045 | Leeds | Dec. 23, 1958 |